Feb. 27, 1945. E. F. STEINERT Re. 22,609

MOVABLE CORE ALTERNATING CURRENT ARC WELDER

Original Filed Jan. 21, 1937

WITNESSES:

Michael Stark

F. V. Giolma

INVENTOR

Emil F. Steinert.

BY

F. M. Crawford

ATTORNEY

Reissued Feb. 27, 1945

Re. 22,609

UNITED STATES PATENT OFFICE 22,609

MOVABLE CORE ALTERNATING-CURRENT ARC WELDER

Emil F. Steinert, Sharon, Pa., assignor to Westinghouse Electric & Manufacturing Company, East Pittsburgh, Pa., a corporation of Pennsylvania Original No. 2,157,871, dated May 9, 1939, Serial No. 121,581, January 21, 1937. Application for reissue July 25, 1940, Serial No. 347,471

21 Claims. (Cl. 171—119)

My invention relates, generally, to welding apparatus and it has reference in particular to an improvement in welding transformer units for alternating-current arc welding systems.

Heretofore, where reactance current limiting control was used with alternating current welding transformers, either a separate tapped reactor element was utilized, or a movable, magnetic shunt member was provided to shunt a portion of the main transformer flux around one of the transformer windings. In the former case, fine adjustments of current setting were impossible without utilizing a multiplicity of taps from the reactance winding, together with a corresponding number of contacts and a sliding contact arm, which must of necessity interrupt the welding circuit whenever changes in the current setting were made. In the latter case, a magnetic unbalance occurred, as the movable member had magnetic lines of force acting on it from one side only. This resulted in a construction in which it was exceedingly difficult to eliminate the noise and vibration due to the unbalanced magnetic pull and in which losses, due to the high magnetic leakage flux, were excessive. Such a transformer was, therefore, not only bulky, but difficult to construct and expensive to maintain.

The object of my invention, generally stated, is to provide an alternating-current welding unit that is of compact construction, readily portable, economical to manufacture, convenient to operate and reasonably silent in operation.

A more specific object of my invention is to provide an alternating-current welding power unit having integrally related transformer and current limiting reactance elements with output varying means operable to vary continuously the output of the unit without interrupting the current supply to the welding circuit.

Another object of my invention is to provide an alternating current welding unit comprising an alternating-current welding transformer and a movable core reactor unit wherein the movable magnetic core of the reactor is so balanced by the magnetic forces as to give a floating action with the resultant reduction of vibration and noise due to magnetic forces.

Still another object of my invention is to provide an alternating-current welding power unit in which a welding transformer and variable reactance current limiting means, provided with output indicating means, are enclosed in a naturally ventilated housing.

A further object of my invention is to provide a unitary alternating-current welding transformer and variable current limiting reactor having an integral magnetic core, the reactor being mounted above the transformer and having a movable magnetic core adapted to provide fine adjustment of current output over the entire range of the transformer without circuit interruption.

Another object of my invention is to provide an alternating current welding power unit wherein the movable core of the reactor element is adjustably supported by vertical movement on a vibration damper to reduce transmission of vibration to the main structure of the power unit.

Other objects of my invention will in part be obvious, and in part be disclosed herein.

In general, in a preferred embodiment of my invention, an alternating-current welding unit may comprise a unitary magnetic core having primary and secondary transformer windings so disposed thereon as to have a plurality of parallel magnetic circuits for the transformer windings. A current limiting reactance winding is mounted coaxially with and above the transformer windings and provided with a magnetic circuit which is integrally related to the magnetic circuits of the transformer windings and is provided with a relatively large air gap. Associated with the current limiting reactance winding and the air gap, in order to vary the current output of the unit, is a movable magnetic core. The entire unit may be disposed within a naturally ventilated housing and provided with suitable handle and wheels for portability. The position of the movable core may be adjusted to vary smoothly the current output of the unit over the entire range of the unit by means of a suitable adjusting mechanism operated by means of a hand wheel located on the outside of the housing, preferably on the top thereof. The adjusting mechanism also supports the movable core on a vibration damper which is mounted on the frame of the unit. An indicating device mounted within the housing adjacent a suitable porthole and operated in accordance with the movements of the movable core is utilized to indicate the current setting of the unit.

For a more complete understanding of the nature and scope of my invention, reference may be had to the following detailed description taken in connection with the drawing, in which.

Figure 1:
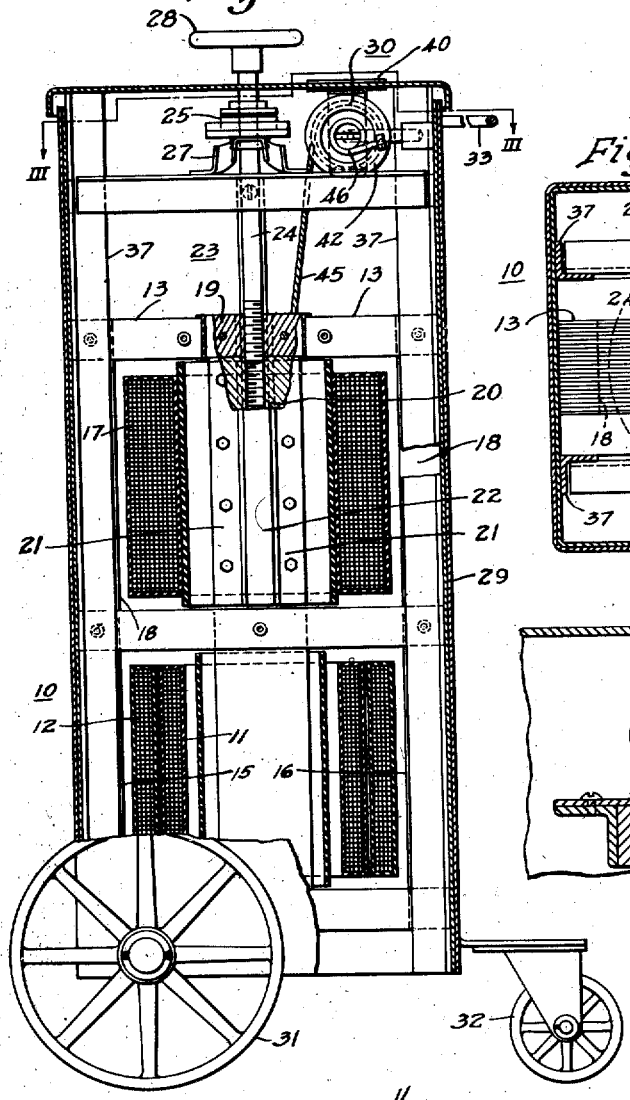
Figure 1 is a sectional side elevation view of a portable welding transformer embodying the principal features of my invention.

Referring particularly to Fig. 1, the reference numeral 10 denotes generally a portable alternating-current welding unit embodying the principal features of my invention and constructed in accordance with what I now believe to be the preferred form of the invention. The unit may comprise a power transformer having a primary winding 11 and a secondary winding 12, herein shown in association with a laminated magnetic core 13 of the shell-type, having parallel magnetic paths 15 and 16. The magnetic circuits of the unit will be described more in detail hereinafter with reference to Fig. 2.

To provide the necessary stabilization of current flow under welding conditions, and means of adjusting the welding current to the desired value, a current limiting reactance winding 17 is connected in series circuit relation with the secondary winding 12 of the transformer. The magnetic circuit associated with the current limiting reactance winding 17 may be clearly seen from Fig. 2, and comprises essentially a fixed magnetic core member 18 which is integral with the magnetic core 13 of the transformer windings. An air gap 19 is provided in the upper end of the magnetic core 18 to assist in securing the desired current stabilizing characteristics in the reactance winding 17.

To provide for varying the effectiveness of the current limiting reactance winding 17, and hence control the output of the transformer unit 10, a movable magnetic core 20 may be used to vary the reluctance of the magnetic circuit 18 of the reactance winding 17. Guide means, herein shown as angle members 21 associated with the movable core 20 and coacting with guide blocks 22, may be provided for securing alignment of the movable core 20.

To enable an operator to readily change the current output of the transformer unit, a suitable adjusting mechanism 23 may be provided for supporting and adjusting the position of the movable core 20. This mechanism may comprise a threaded shaft 24 rotatably supported by a bearing 25 mounted upon a vibration damper 27. A handwheel 28 is secured to the upper end of the shaft 24, outside the enclosing casing 29, for rotating the shaft 24 to adjust the position of the movable core 20. The lower end of the shaft 24 is disposed in threaded engagement with the movable core 20 so as to smoothly vary the position of the movable core 20 with respect to the current limting reactance winding 17 upon rotation of the shaft 24, thus varying the current output of the transformer 10. Indicating means 30 may be positioned within the casing 29, visible to the operator, so he may readily adjust the power unit 10 for any desired current outpput.

In view of the foregoing, it will be apparent that this arrangement of mounting the reactor element of the unit directly over the transformer element permits the use of an integral magnetic circuit, requires a minimum of floor space, and provides a height convenient for operation.

The movable core 20 is disposed to move vertically within the reactance winding 17 and between the two opposite faces of the air gap 19 of the stationary core. Since the magnetic forces in the two gaps thus formed are equal and opposite in direction, all vibration and noise from this source are practically eliminated. In addition, by the use of a movable magnetic core in association with the reactance winding and the relatively large air gap, smooth regulation of the output of the power unit may be obtained over the entire range without the necessity of interrupting the circuit under load, as is the case with the tapped type of reactance winding.

The use of the vibration damper 27 for supporting the operating mechanism 23 of the movable core permits the mass of the core to absorb the pulsating magnetic force acting on its lower end and practically eliminates the vibration thereof from the main frame. Further, by so constructing the magnetic core of the reactance element of the welding unit that the movable core is centrally located within the stationary core, a balance of magnetic forces is obtained, with a resultant quietness of operation.

To provide for readily moving the transformer unit 10 from place to place, mounting means comprising a pair of axially related wheels 31 and a pivotal guide wheel 32 are adapted to be secured to the housing 29. Handle means, such as indicated at 33, may be utilized to assist in making the unit more readily portable.

Figure 2:
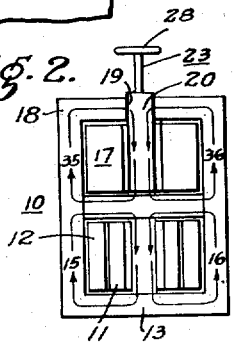
Fig. 2 is a diagrammatic view of the magnetic circuit of the transformer shown in Fig. 1.

Referring to Fig. 2, a schematic diagram of the magnetic circuits of the welding power unit 10 is shown. It may be seen that the primary winding 11, secondary winding 12, and magnetic core 13 with its parallel magnetic circuits 15 and 16 comprise generally a shell-type transformer. Integrally associated with the magnetic core 13 of the transformer windings is an auxiliary magnetic circuit 18 provided with an air gap 19. The current limting reactance winding 17 is coaxially positioned with respect to the transformer windings 11 and 12, and has associated with it a movable magnetic core 20 which may be adjusted through operation of the adjusting mechanism 23 to vary the current output of the welding power unit 10. The movable core 20 is disposed, in association with the magnetic core 18, to provide a pair of parallel magnetic circuits 35 and 36 of adjustable magnetic reluctance for the reactance winding 17.

Figure 3:
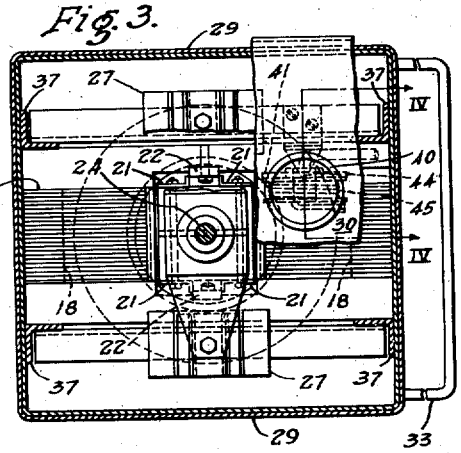
Fig. 3 is a sectional view of the transformer of Fig. 1 along the line III—III.

Referring to Fig. 3, which is a sectional view of the transformer unit along the line III—III of Fig. 1, it may be seen that the magnetic core 13 comprises a plurality of laminations centrally located within the enclosing housing 29. In practice, these laminations may, and particularly in the smaller sizes, be formed as units, or else comprise in themselves an assembly of smaller laminated sections so correlated as to secure an integral core unit. They may be secured within the housing 29 by means of a supporting frame 37 in any well known manner.

Figure 4:
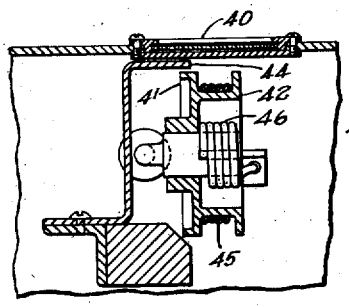
Fig. 4 is an enlarged sectional view taken along the line IV—IV of Fig. 3 of the current indicating mechanism.

From Fig. 4, which is an enlarged view of the indicating mechanism 30, it may be seen that a window 40 is provided in the top of the housing 29 whereby calibrations on an indicating rim 41 of a rotatable drum 42 may be observed in relation to a pionter 44 to indicate the current output of the power unit. To provide for rotation of the drum 42 in accordance with the position of the movable magnetic core 20, a connecting cable 45 may be associated with the movable core 20 and the drum 42, being for instance, wound around the drum 42 and secured at the other end to the movable core. A biasing spring 46, secured at one end to the rotating drum 42 and fixed at the other end, may be provided to maintain tension in the cable 45 and to urge the rotating drum 42 in the desired direction when the movable core is raised.

Figure 5:
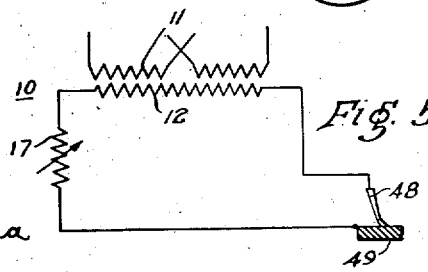
Fig. 5 is a diagrammatic view of a welding circuit showing the circuit connections of the transformer and reactor windings.

Fig. 5 is a schematic diagram of a welding circuit wherein might be used a welding transformer unit of my invention. It comprises generally a transformer power unit 10, having a sectional primary winding 11, a secondary winding 12, and an adjustable current limiting reactance winding 17 connected in the welding circuit, which includes an electrode 48, adapted to perform a welding operation upon work 49. By variation of the impedance of the reactance winding 17, the current in the welding circuit may be adjusted to any desired value within the operating range of the unit.

It may be seen from the above description, taken in connection with the accompanying drawing, that by my invention I have provided a portable alternating-current welding unit wherein the transformer and current limiting reactor are integrally combined to produce a compact structure which may be suitably enclosed and readily moved from place to place. It is not only simple and economical to manufacture, but easy to adjust and maintain. There are a minimum of moving parts, with the resultant reduction in operating losses, and such moving parts are symmetrically disposed with respect to the magnetic forces acting upon them, resulting in a floating construction which is reasonably quiet in operation and practically free from vibration. The output of the unit may be readily altered under load simply by rotation of the operating handwheel without any interruption of the welding circuit and there are no sliding contacts to clean or replace.

Since certain changes may be made in the above construction, and different embodiments of the invention may be made without departing from the spirit thereof, it is intended that all the matter contained in the foregoing description, or shown in the accompanying drawing shall be considered as illustrative, and not in a limiting sense.

I claim as my invention:

1. The combination in a power unit of a plurality of transformer windings, a fixed current limiting reactance winding disposed in coaxial relation with said transformer windings, a unitary magnetic core disposed to provide a plurality of closed magnetic circuits for the transformer windings and a relatively high reluctance magnetic circuit about the reactance winding, and means including an adjustable core movable to vary the reluctance of the magnetic path within the reactance winding.

2. The combination in a power unit of transformer windings for supplying current to a load, a reactance winding for limiting the load current disposed in coaxial relation with the transformer windings, a unitary magnetic core adapted to provide a plurality of separate magnetic circuits for the transformer and reactance windings, and a movable core member coaxial with said windings adjustable to vary the reluctance of the magnetic path within the reactance winding.

3. The combination in a power transformer unit of a magnetic core, a plurality of power windings disposed upon the magnetic core, a separate current limiting reactance winding coaxially disposed in relation to said power windings, a path of relatively high reluctance disposed about the reactance winding integral in part with said magnetic core, and a magnetic core movable within the reactance winding to vary the reluctance of the magnetic flux path through the reactance coil.

4. An integral transformer and current limiting reactor comprising, primary and secondary transformer windings, a coaxially related current limiting reactance winding, a unitary magnetic core disposed to provide magnetic circuits for the windings, a movable magnetic core disposed within the reactance winding to vary the reluctance of the magnetic circuit of the reactance winding, and adjusting means including a vibration damper as a part thereof for resiliently supporting and adjusting the position of the movable core.

5. A transformer for a welding process comprising, primary and secondary transformer windings, a laminated magnetic core associated with said windings, a current limiting reactance winding coaxially related with the transformer windings, a relatively high reluctance magnetic circuit for said reactance winding having a fixed portion integral with said laminated magnetic core and a movable core portion within the fixed portion adjustable to limit the current of the transformer to a predetermined value, and indicating means operable from the movable core portion, to indicate the current output of the transformer.

6. An integral transformer and reactor for a welding process comprising the combination of, a welding transformer having a plurality of windings and a laminated magnetic core, a current limiting reactance winding disposed in coaxial relation to the transformer windings, a variable reluctance magnetic circuit disposed about the reactance winding to provide a relatively low reactance current limiting winding and integral in part with the magnetic core of the transformer, means operable to vary the reluctance of the magnetic circuit of the reactance winding to alter the current output of the transformer, and indicating means including a rotatable graduated drum and a flexible connector associated with the reluctance varying means to indicate the current output of the welding transformer for a given position of the reluctance varying means.

7. A unitary welding transformer and current limiting reactor comprising, primary and secondary transformer windings, a laminated shell-type magnetic core disposed about the transformer windings, an auxiliary magnetic core provided with a central opening integral with the shell-type magnetic core, a current limiting reactance winding positioned coaxially above the transformer windings in the central opening of the auxiliary magnetic core, means including a relatively large air gap in the auxiliary magnetic core and a resiliently mounted core portion movable within the air gap and auxiliary core to vary the current output of the transformer, a common enclosing housing for the transformer and reactor, and wheel means to provide for moving the unit.

8. A unitary construction for a transformer and a current limiting reactor comprising, in combination, a common magnetic core member, transformer windings associated with the core member, a current limiting reactance winding positioned within an opening in the common core coaxial with and above the transformer windings, a frame member disposed to support the core member and windings, a movable core member associated with the reactance winding and the common magnetic core to vary the impedance of the reactance winding and limit the current output of the transformer, means operable to adjust the movable core member resiliently secured to the frame, indicating means associated with the movable core member to indicate the current output of the transformer for a given position of the movable core member, a unitary metal enclosure for the transformer and reactor, and mounting means including a pair of wheels to provide for moving the unit.

9. The combination of a current limiting reactor integral with a transformer, comprising, transformer windings cooperative to effect a transfer of electric power, a laminated magnetic core associated with the windings to provide a plurality of closed magnetic circuits for the transformer windings, a current limiting reactance winding disposed in coaxial relation with the transformer windings, and means including a movable core associated with the reactance coil and fixed core portions integral with the transformer core disposed to provide a relatively high reluctance magnetic path about the reactance winding operable to vary the current output of the transformer.

10. A portable alternating-current welding power unit comprising, in combination, a plurality of transformer windings, a current limiting reastance winding disposed in coaxial relation with the transformer windings, a laminated magnetic core having integrally-related closed magnetic paths for the transformer windings and open magnetic paths for the reactance winding adapted to provide a balanced magnetic field, and adjusting means for resiliency supporting a movable core member within the reactance winding and in association with a relatively large air gap in the laminated magnetic core operable to vary the current output of the unit.

11. A portable alternating-current welding power unit comprising, in combination, a plurality of transformer windings, a vertically disposed main magnetic core having a plurality of parallel magnetic circuits associated with the transformer windings, a current limiting reactance winding positioned above the transformer windings in coaxial relation and associated with an auxiliary magnetic circuit of the main magnetic core, a movable magnetic core positioned within the reactance winding in relation to the auxiliary magnetic circuit operable to vary the current output of the unit by continuously varying the impedance of the reactance winding, means for resiliently supporting and moving last mentioned core, a unitary housing member adapted to enclose the cores and windings, and wheel means adapted to permit movement of the unit.

12. A construction for a portable alternating current power unit comprising, in combination, a stationary laminated magnetic core having closed and open magnetic circuits, transformer windings associated with the closed magnetic circuits of said magnetic core disposed to effect a transfer of electric power, a reactance winding associated with the open magnetic circuits of the magnetic core in coaxial relation with the transformer windings, a movable core member disposed coaxially with the reactance winding and a relatively large air gap in the open magnetic circuit operable to vary the impedance of said reactance winding to limit the power transferred, a frame disposed to support the stationary core and winding, adjusting means operable to vary the position of the movable core, and means disposed to resiliently support the adjusting means.

13. A current-adjusting means including, a three-legged core of suitable magnetic material, the core having a bottom yoke joining the outer legs and a divided top yoke, between the division of which the middle core leg is positioned for movement therebetween, the entire middle leg being mechanically separate from the rest of the core and movable and having a stationary winding in a load circuit and encompassing said middle core leg, with means for moving it to change the current through its winding to the load.

14. A current-adjusting means including a three-legged core of suitable magnetic material, the core having a bottom yoke joining the outer legs and a divided top yoke, between the division of which the middle core leg is positioned for movement therebetween, the entire middle core leg being mechanically separate from the rest of the core and movable and having a stationary winding in a load circuit and encompassing said leg, and means for moving the said core leg in and out of its winding to change the value of the current going to the load.

15. A current-adjusting means including a three-legged core of suitable magnetic material, the core having a bottom yoke joining the outer legs and a divided top yoke, between the division of which the middle core leg is positioned for movement therebetween, the entire middle core leg being mechanically separate from the rest of the core and movable and having a stationary winding in a load circuit including load terminals and encompassing said leg, the voltage at the load terminals being a maximum when the core is in yoke bridging position to cause its winding to deliver minimum current.

16. A current-adjusting means comprising, a three-legged core structure of laminated magnetic material having a bottom yoke joining the outer legs and a divided top yoke, between the division of which the middle core leg is positioned for longitudinal movement therebetween relative to the bottom yoke, a stationary winding positioned around the movable middle core leg for connection to a load circuit, and means adjustably supporting the movable middle core leg.

17. A current-adjusting means comprising, a three-legged core structure of laminated magnetic material having a bottom yoke joining the outer legs and a divided top yoke, between the division of which the middle core leg is positioned for longitudinal movement therebetween relative to the bottom yoke, a stationary winding positioned around the movable middle core leg for connection to a load circuit, and means including a vibration damping means for supporting and adjusting the position of the movable middle core leg.

18. A current-adjusting means comprising, a three-legged core structure of magnetic material, said core structure having a bottom yoke and a divided top yoke, the middle core leg being positioned for longitudinal movement between the opposed faces of the divided top yoke, a stationary winding positioned about the movable middle core leg, and means including a rotatably mounted shaft in threaded engagement with the movable middle core leg for adjusting the position thereof within the stationary winding.

19. An integral transformer and variable reactor structure comprising, primary and secondary transformer windings and a reactance winding, and a unitary three-legged magnetic core structure disposed to provide magnetic circuits for the windings, said core structure having its outer legs joined together at one end and intermediate their ends by bottom and intermediate yokes and having a divided top yoke, the middle core leg being comprised of top and bottom portions, the bottom portion being integral with the bottom and intermediate yokes and the top portion being disposed for longitudinal movement between the division of the divided top yoke and within the reactance winding, said primary and secondary windings being positioned around the secondary bottom portion of the middle core leg.

20. An integral transformer and variable reactor structure comprising, primary and secondary transformer windings and a reactance winding, and a unitary three-legged magnetic core structure disposed to provide magnetic circuits for the windings, said core structure having a bottom portion providing a closed magnetic circuit for the transformer windings and a top portion providing a magnetic circuit of variable reluctance for the reactance winding, said top portion of the core structure including a separate middle core leg mounted for longitudinal movement within the reactance winding.

21. A current controlling device comprising a three-legged core structure of laminated magnetic material having its outer legs joined together by bottom and middle yokes and having a divided top yoke, the lower portion of the middle core leg being integral with the bottom and middle yokes and the upper portion of the middle core leg being mechanically separate from the rest of the core structure and disposed for longitudinal movement between the opposite faces of the divided top yoke, primary and secondary windings positioned on the lower stationary portion of the middle core leg, an auxiliary stationary winding positioned around the upper movable portion of the middle core leg and connected in series circuit relation with the secondary winding, and means for supporting and adjusting the position of the upper movable portion of the middle core leg.

EMIL F. STEINERT.